Figure 1:
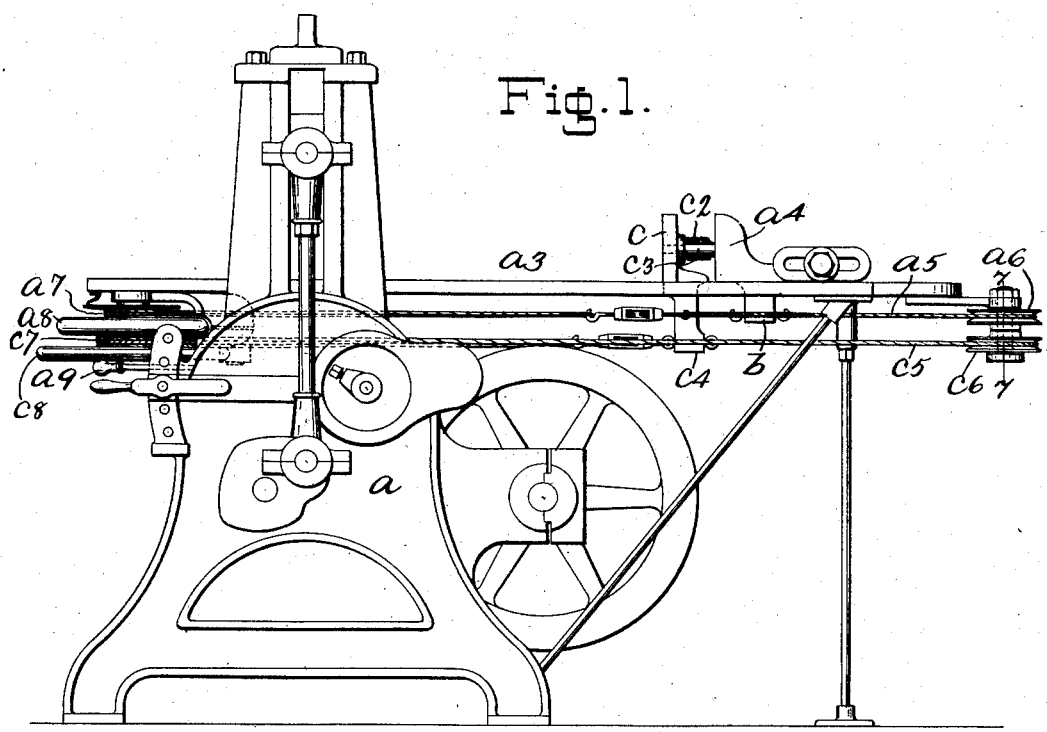

No. 738,534. PATENTED SEPT. 8, 1903.
M. G. FERRAHIAN.
PAPER CUTTING MACHINE.
APPLICATION FILED MAR. 19, 1903.
NO MODEL. 3 SHEETS—SHEET 1.

WITNESSES
J. C. Larsen
F. A. Stewart

INVENTOR
Matthew G. Ferrahian
BY Edgar Tate & Co
ATTORNEYS

No. 738,534. PATENTED SEPT. 8, 1903.
M. G. FERRAHIAN.
PAPER CUTTING MACHINE.
APPLICATION FILED MAR. 19, 1903.
NO MODEL. 3 SHEETS—SHEET 2.

WITNESSES
J. C. Larsen
F. A. Stewart

INVENTOR
Matthew G. Ferrahian
BY
Edgar Tate & Co
ATTORNEYS

No. 738,534. PATENTED SEPT. 8, 1903.
M. G. FERRAHIAN.
PAPER CUTTING MACHINE.
APPLICATION FILED MAR. 19, 1903.
NO MODEL. 3 SHEETS—SHEET 3.
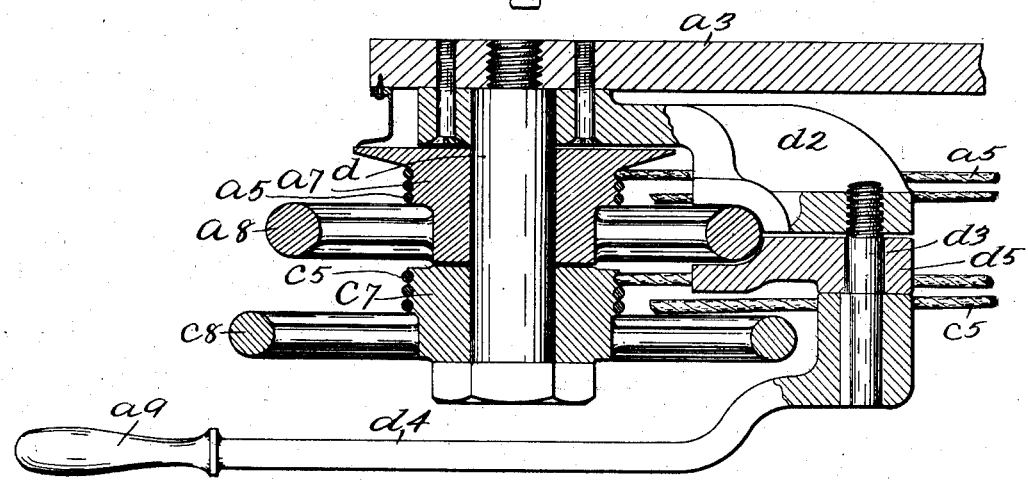
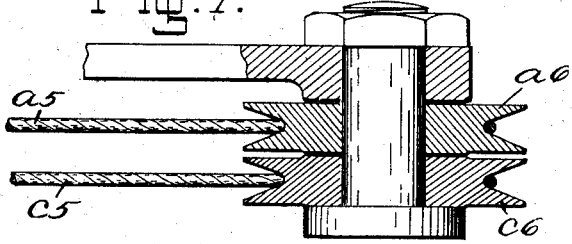
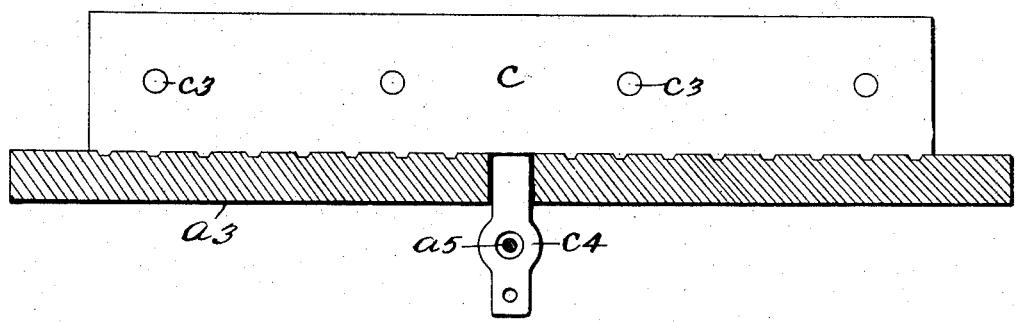
WITNESSES
J. C. Larsen
F. A. Stewart
INVENTOR
Matthew G. Ferrahian
BY
Edgar Tate & Co
ATTORNEYS No. 738,534. Patented September 8, 1903.

UNITED STATES PATENT OFFICE.

MATTHEW G. FERRAHIAN, OF NEW YORK, N. Y.

PAPER-CUTTING MACHINE.

SPECIFICATION forming part of Letters Patent No. 738,534, dated September 8, 1903.

Application filed March 19, 1903. Serial No. 148,464. (No model.)

*To all whom it may concern:*

Be it known that I, MATTHEW G. FERRAHIAN, a citizen of the United States, residing at New York, in the county of New York and State of New York, have invented certain new and useful Improvements in Paper-Cutting Machines, of which the following is a specification, such as will enable those skilled in the art to which it appertains to make and use the same.

The object of this invention is to provide an improvement for paper-cutting machines whereby the paper may be easily removed from said machines after having been cut and without danger to the operator, a further object being to provide a device of the class described which will accomplish the result desired without interfering with the regular mechanism of said machines.

In machines as at present constructed a gage is provided which regulates the size of the paper to be cut, and after the blade has descended and cut the sheets of paper and having again risen the operator must place his hands beneath the blade to remove the cut sheets of paper, and it frequently occurs that the blade descends and often injures or cripples the operator. Machines of this class have been provided with a gage which may be operated to move the paper out; but if a number of portions of paper are to be cut of the same size the gage after having been once moved is difficult to bring into its former or desired position, as will be readily understood.

The invention is fully disclosed in the following specification, of which the accompanying drawings form a part, in which the separate parts of my improvement are designated by suitable reference characters in each of the views, and in which—

Figure 2:
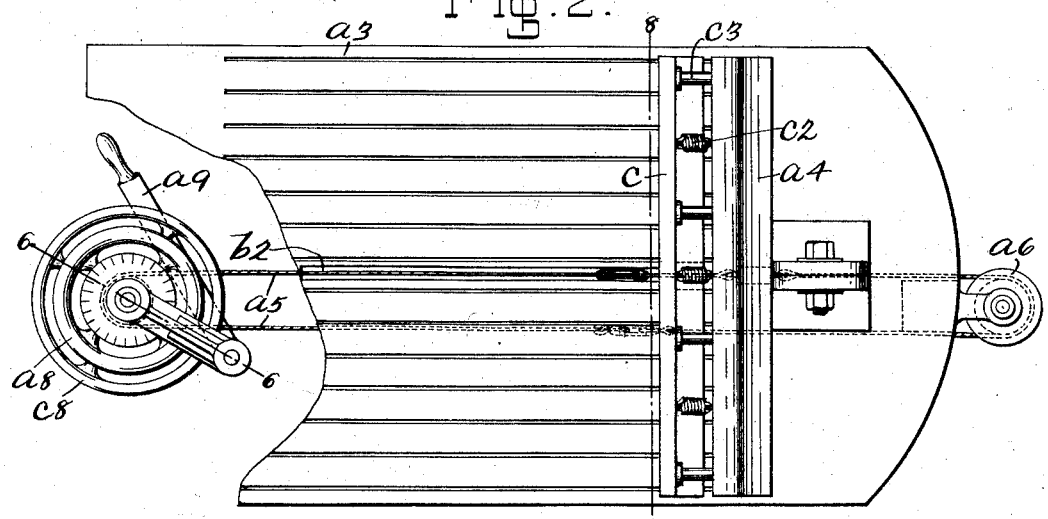
Figure 3:
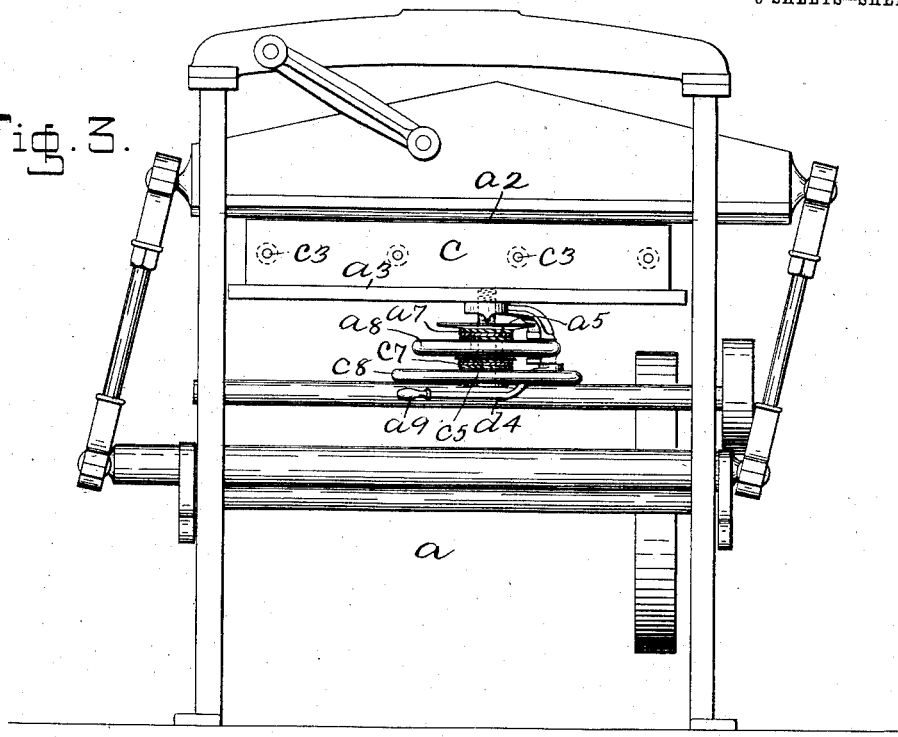
Figure 4:
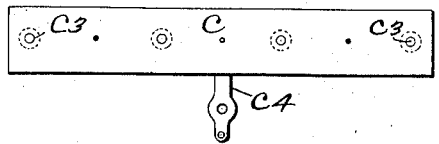
Figure 5:
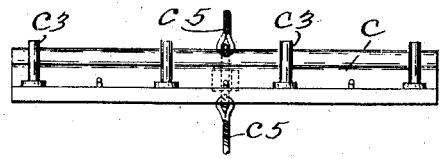

Figure 1 is a side view of a paper-cutting machine provided with my improvement; Fig. 2, a plan view thereof, partially broken away and showing part of the operative mechanism thereof; Fig. 3, a front view of said machine; Figs. 4 and 5, detail views of a part of my improvement; Fig. 6, a section on the line 6 6 of Fig. 2; Fig. 7, a section on the line 7 7 of Fig. 1, and Fig. 8, a section on the line 8 8 of Fig. 2.

In the drawings forming part of this specification I have shown an ordinary paper-cutting machine $a$, which is provided with the usual cutting-blade $a^2$ and operating mechanism therefor, as well as a cutting-table $a^3$. The cutting-machine $a$ is also provided with a gage $a^4$, adapted to slide longitudinally of and on the table $a^3$ and is adapted to be operated by means of a cable $a^5$, passing around a pulley $a^6$ at the rear of said machine and a pulley $a^7$ at the front of said machine, said pulley $a^7$ being provided with a hand-wheel $a^8$ and a locking-lever $a^9$, all of this being of the usual construction and forming no part of my invention.

The gage $a^4$, as clearly shown in Fig. 2, extends almost entirely across the table $a^3$ and is generally provided with a member $b$, which projects downwardly through a slot $b^2$ in the table $a^3$ and beneath the same, and the cable $a^5$ is secured to the downwardly-projecting member $b$, and when the hand-wheel $a^8$ is turned it will be apparent that the gage $a^4$ is moved accordingly.

In the practice of my invention I provide a supplemental plate or member $c$, which is preferably of the same length as the gage $a^4$ and is connected therewith by means of a plurality of coil-springs $c^2$, and operating as stops between the plate $c$ and the gage $a^4$ are a plurality of posts $c^3$, which are of such a size as to keep the plate $c$ parallel with the gage $a^4$. The plate $c$ is provided with a downwardly-projecting member $c^4$, which passes through the slot $b^2$ in the table $a^3$ and to a predetermined distance beneath said table, and the member $c^4$ has a cable $c^5$ similar to the cable $a^5$, connected with it, and said cable $c^5$ passes around a loose pulley $c^6$, similar to and on the same central shaft as the pulley $a^6$ and around a supplemental pulley $c^7$ at the front of said machine and beneath the pulley $a^7$, and the pulley $c^7$ is also provided with a hand-wheel $c^8$, which is preferably larger in diameter than the hand-wheel $a^8$, and the cables $a^5$ and $c^5$ are preferably turned several times around the pulleys $a^7$ and $c^7$ to decrease the danger of slipping thereon.

As will be seen in Fig. 6, the pulley $a^7$ revolves on a shaft or bolt $d$, which is secured beneath the table $a^3$, and between the pulley $a^7$ and the table $a^3$ is a hanger $d^2$, which carries a screw-threaded pulley $d^3$, to which is secured at the bottom thereof a lever $d^4$, and, as will be apparent, when the lever $d^4$ is moved the block $d^5$, arranged between said lever $d^3$ and hanger $d^2$, either locks or releases the hand-wheel $a^8$, and in this manner the gage $a^4$ may be adjusted and secured beneath the pulley $a^7$, and on the same shaft $d$ is the pulley $c^7$, which, as will be seen from the drawings, is free to revolve thereon, and the operation of the hand-wheel $a^8$ in either direction also revolves the hand-wheel $c^8$, for the reason that the plate $c$, which is operated by the cable $c^5$ in connection with the hand-wheel $c^8$, is secured to the gage $a^4$, which is operated by the hand-wheel $a^8$; but if the hand-wheel $c^8$ be operated to withdraw the plate $c$ from the gage $a^4$ and the hand-wheel $a^8$ being locked by means of the hand-lever $a^9$ said hand-wheel and gage $a^4$ thereof are not affected, and when the hand-wheel $c^8$ is released the springs $c^2$ draw the plate $c$ back into its normal position with reference to the gage $a^4$, and the hand-wheel $c^8$ also is returned to its former position.

By means of this construction it will be seen that when the paper to be cut is placed in position, the gage having previously been set and the cutting-blade having descended, cut the paper, and again risen, the turning of the hand-wheel $c^8$ will draw the plate $c$ forwardly, carrying the paper with it, so that the operator may grasp the same and remove it from the table $a^3$ without danger, and when the operator releases the hand-wheel $c^8$ said plate is again drawn into its former position by means of the spring $c^2$, and the gage $a^4$ not having been affected thereby the exact size of paper may again be cut, and this operation may be repeated as often as desired, there being no possible variation in the sizes of the sheets cut in the several operations, and this has heretofore been impossible if the gage is at any time moved between said operations.

Although I have shown my invention applied to one particular type of paper-cutting machines, it will be apparent that the same may be applied to any type of machines, and while I have shown a hand-operated mechanism it will also be observed that the same result may be accomplished by foot or other power, and various other changes in and modifications of the construction herein shown and described may be made without departing from the spirit of my invention or sacrificing its advantages.

Having fully described my invention, what I claim as new, and desire to secure by Letters Patent, is—

In combination with a paper-cutting machine provided with the usual frame, cutting-blade, table and gage, a longitudinally-movable plate on said table and in front of said gage, and means for operating said plate, consisting of a plurality of coil-springs connecting said plate with said gage, a plurality of stops on said plate operating in connection with said gage, a downwardly-projecting member secured to said plate, a cable adjustably connected therewith, said cable passing around a pulley at the rear of said machine and around a supplemental pulley at the forward end of said machine and a hand-wheel secured to said supplemental pulley, substantially as shown and described.

In testimony that I claim the foregoing as my invention I have signed my name, in presence of the subscribing witnesses, this 18th day of March, 1903.

MATTHEW G. FERRAHIAN.

Witnesses:
J. C. LARSEN,
F. A. STEWART.